(12) United States Patent
Harding

(10) Patent No.: US 7,160,474 B2
(45) Date of Patent: Jan. 9, 2007

(54) METHOD AND APPARATUS FOR REMOVING CUTTINGS FROM DRILLING FLUIDS

(76) Inventor: Darin Merle Harding, P.O. Box 636, Beaverlodge, Alberta (CA) T0H 0C0

( * ) Notice: Subject to any disclaimer, the term of this patent is extended or adjusted under 35 U.S.C. 154(b) by 51 days.

(21) Appl. No.: 10/983,564

(22) Filed: Nov. 8, 2004

(65) Prior Publication Data

US 2006/0096935 A1     May 11, 2006

(51) Int. Cl.
 *B01D 21/02* (2006.01)
(52) U.S. Cl. .................. 210/801; 210/803; 210/519; 210/521; 210/523; 210/532.1
(58) Field of Classification Search .............. 210/710, 210/712, 801, 803, 804, 195.1, 207, 259, 210/519, 521, 523, 532.1, 540
See application file for complete search history.

(56) References Cited

U.S. PATENT DOCUMENTS

| | | | | |
|---|---|---|---|---|
| 1,044,845 A | * | 11/1912 | Argall ...................... | 210/523 |
| 1,732,386 A | * | 10/1929 | Sprockhoff .................. | 210/523 |
| 2,118,157 A | * | 5/1938 | Camp ........................ | 210/519 |
| 4,042,512 A | * | 8/1977 | McCarthy et al. ............ | 210/521 |
| 4,059,529 A | * | 11/1977 | McGivern .................... | 210/519 |
| 4,722,800 A | * | 2/1988 | Aymong ...................... | 210/519 |
| 5,186,821 A | * | 2/1993 | Murphy ....................... | 210/519 |
| 5,204,000 A | * | 4/1993 | Steadman et al. ........... | 210/519 |
| 5,814,230 A | * | 9/1998 | Willis et al. ................. | 210/804 |
| 6,059,977 A | * | 5/2000 | Rowney et al. ............. | 210/712 |
| 6,391,195 B1 | * | 5/2002 | Layton ....................... | 210/519 |
| 6,808,626 B1 | * | 10/2004 | Kulbeth ....................... | 210/804 |
| 6,997,328 B1 | * | 2/2006 | Wilcher et al. ............. | 210/519 |

\* cited by examiner

*Primary Examiner*—Christopher Upton
(74) *Attorney, Agent, or Firm*—Macheledt, Bales & Heidmiller LLP

(57) ABSTRACT

The present invention is concerned with a method and apparatus for recycling drilling fluids used in the drilling of wells. The apparatus comprises a tank with a plurality of compartments. Used drilling fluid containing well cuttings or "solids" is pumped into a receiving compartment of the tank and directed towards a flow-reversing barrier. Reversal of the flow causes heavier solids to settle to the bottom of the tank. As fluid fills the receiving compartment, it flows downstream into an adjacent compartment by passing through a flow-restricting baffle that causes more solids to settle to the bottom of the tank. As fluid overflows from compartment to compartment in the tank, it passes through successive flow-restricting baffles causing further solids to settle to the bottom of the tank. When the fluid reaches the collecting compartment of the tank, it is removed to be used again in drilling operations. A conveyor extending along the bottom of the tank is used to move the settled solids to the collecting compartment, from which they are removed and pumped through a centrifuge to recover residual fluids.

11 Claims, 5 Drawing Sheets

METHOD AND APPARATUS FOR REMOVING CUTTINGS FROM DRILLING FLUIDS

FIELD OF INVENTION

The present invention relates to a method and apparatus for recycling drilling fluids used in the drilling of wells.

BACKGROUND OF THE INVENTION

The drilling of wells in the recovery of oil and gas typically comprises a rig drilling the well with a hollow drill string. As the well is being drilled, drilling fluids are pumped down the bore of the string. The drilling fluid passes through openings in the drill bit and returns to the surface through the annulus surrounding the string, carrying the cuttings produced by the drill bit. The drilling fluid is then recycled to remove the cuttings so that it may be used again.

Traditional methods of recycling drilling fluid include using a centrifuge to separate the liquid from the cuttings. In large drilling operations, to keep up with the volume of drilling fluid used, it is necessary to use either a very large centrifuge or to use a multitude of centrifuges. In either case, the costs of operating such a drilling fluid recycling system are substantial.

It is known to use a settling tank in combination with a centrifuge in a fluid recycling system.

The settling tank is used as a preliminary step to settle the cuttings from the fluid. The cuttings often remain in suspension in the fluid and are often referred to as "solids". Flocculating agents may be introduced into the tank to assist in the settling of solids. The drilling fluids are pumped into the receiving end of the tank. The tank has a plurality of transverse walls or baffles that form a plurality of compartments within the tank. Each wall has an opening to permit the flow of fluid from an upstream compartment to a downstream compartment. The openings are positioned on the walls in such a manner that the fluid follows a sinuous path as it flows from the receiving end to the collecting end of the tank. As fluid flows from compartment to compartment, solids in the fluid settle to the bottom of the tank.

Once fluid reaches the collecting end of the tank, it is withdrawn from the tank to be used in the drilling operation. The settled solids are conveyed towards the receiving end of the tank using an auger. A slurry of settled solids and fluid are withdrawn from the tank and pumped through a centrifuge. Fluid recovered from the centrifuge is re-introduced into the tank at the receiving end.

While using the combination of settling tank and centrifuge is an improvement in comparison to using a centrifuge by itself, in practice, this circuit is often unable to keep up with the throughput of drilling fluid required in drilling a well. It is often necessary to temporarily halt drilling of the well until the settling tank and centrifuge can catch up and recover enough drilling fluid to commence drilling operations again.

The present invention addresses the shortcomings of the prior art and provides a method and apparatus that is better capable of recycling drilling fluid in sufficient quantity for typical drilling operations.

SUMMARY OF THE INVENTION

The present invention is concerned with a method and apparatus for recycling drilling fluids used in the drilling of wells.

The apparatus of the present invention comprises a tank whose interior space is sub-divided into a plurality of compartments. Transverse walls are located within the tank, spaced approximately equidistant apart along the length of the tank to define the compartments of the tank. At one end of the tank, there is a receiving compartment. At the other end, there is a collecting compartment. A flow-reversing barrier located in the receiving compartment. The barrier comprises a vertical rectangular back panel with two vertical rectangular side panels extending perpendicular from the back panel to form a U-shaped structure. A bottom rectangular plate extends from the back panel partway along the bottom edges of the side panels, partially enclosing the bottom of the barrier.

In each of the transverse walls, there is an opening in the upper end of the wall that enables fluid to flow from an upstream compartment into an adjacent downstream compartment. A flow-restricting baffle is mounted on the downstream side of each transverse wall, aligned with the opening. The baffle comprises a vertical rectangular back plate with two vertical rectangular side walls that extend perpendicular from the back plate to form a U-shaped structure. The baffle attaches to the wall on either side of the opening. The top edges of the plate and side walls are substantially aligned with the top of the transverse wall whereas the bottom edge of the plate extends lower into the compartment than the side walls. Each baffle side wall has a plurality of openings or slots.

The bottom wall of the tank forms at least one trough that runs lengthwise along the tank, passing through each of the compartments. There is a conveyor in each trough for moving solids towards the collecting compartment. In the preferred embodiment of the apparatus, there are four compartments and two troughs running along the bottom of the tank, each trough comprising an auger.

The method of the present invention comprises pumping drilling fluid containing solids into the receiving compartment and directing the fluid towards the flow-reversing barrier. As the fluid strikes the barrier, the fluid stops and reverses its flow in order to flow around the side panels of the barrier. This causes heavier solids within the fluid settle to the bottom of the tank.

As fluid fills the receiving compartment, the level of the fluid will rise to the opening in the transverse wall separating the receiving compartment from the adjacent downstream compartment. Fluid flowing through the opening encounters the flow-restricting baffle where it passes through the slots in the side walls and the bottom opening of the baffle. This causes solids in the fluid to settle to the bottom of the tank.

As fluid flows from compartment to compartment, it passes through subsequent baffles in each transverse wall opening until the fluid reaches the collecting compartment. By the time the fluid reaches the collecting compartment, substantially all of the solids in the fluid have settled to the bottom of the tank. Fluid is then removed from the collecting department to be used again in the drilling operations.

The settled solids are moved towards the collecting compartment by an auger in each trough. The augers expel a slurry of solids and fluid through outlets on the end wall of the tank. The slurry is then pumped through a centrifuge. The residual fluid in the slurry is removed by the centrifuge and introduced back into the receiving compartment.

A flocculating chemical agent may also be used to assist in settling solids from the drilling fluid. In the apparatus as built, drilling fluid is skimmed from the collecting compartment and mixed with a flocculating chemical. The mixture is pumped into the receiving compartment and mixes with the received drilling fluid.

Broadly stated, one aspect of the present invention is a method for recycling drilling fluid used in drilling operations comprising the steps of directing a stream of drilling fluid containing solids into a flow-reversing barrier located in a receiving compartment of a settling tank, the settling tank further comprising a collecting compartment, the collecting compartment separated from the receiving compartment by a transverse wall, the wall defining an aperture with a flow-restricting baffle attached thereto, the flow-reversing barrier capable of causing the stream to reverse direction and flow around the barrier thereby causing at least some of the solids contained in the fluid to settle to the bottom of the tank, allowing the stream of fluid to fill the receiving compartment and pass through the aperture and flow-restricting baffle of the transverse wall as the fluid flows in a first direction from the receiving compartment to the collecting compartment, the flow-restricting baffle capable of causing at least some of the remaining solids contained in the fluid to settle to the bottom of the tank as the fluid flows through the aperture and baffle, allowing the fluid to flow in the first direction and fill the collecting compartment, extracting fluid from the collecting compartment for re-use in drilling operations, moving the settled solids on the bottom of the tank in the first direction towards an outlet located in the collecting compartment, and removing a mixture of fluid and solids from the outlet.

Broadly stated, another aspect of the present invention is an apparatus for recycling drilling fluid used in drilling operations comprising a settling tank having first and second end walls, two side walls extending between the end walls and a bottom enclosing the area defined by the bottom edges of the end walls and the side walls, the tank forming a receiving compartment adjacent to the first end wall and a collecting compartment adjacent to the second end wall, the second end wall defining an outlet, a flow-reversing barrier mounted in the receiving compartment, the barrier adapted to receive a stream of drilling fluid containing solids, the barrier capable of causing the stream to reverse direction and flow around the barrier thereby causing at least some of the solids contained in the fluid to settle to the bottom of the tank, a wall transversely mounted in the tank between the side walls, the wall separating the receiving and collecting compartments, the wall defining an aperture having a flow-restricting baffle, the baffle extending perpendicular from the wall towards the collecting compartment, the baffle capable of causing at least some of the remaining solids contained in the fluid to settle to the bottom of the tank as fluid flows in a first direction from the receiving compartment to the collecting compartment and passes through the aperture and baffle, and a material conveyor for moving the settled solids at the bottom of the tank towards the outlet on the second end wall.

DETAILED DESCRIPTION OF THE PREFERRED EMBODIMENT

Figure 1:
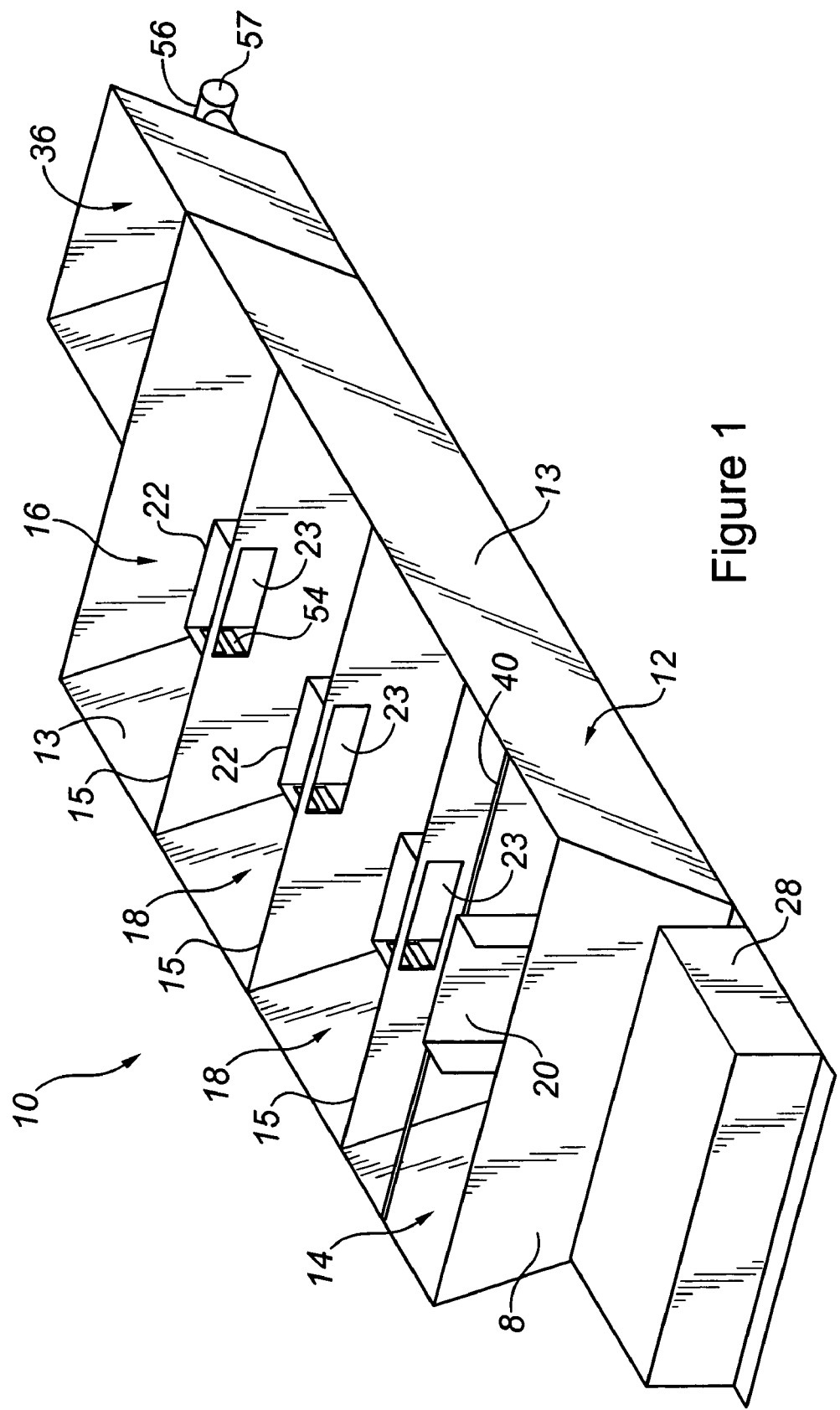
FIG. 1 is a perspective view of the apparatus of the present invention.
Figure 2:
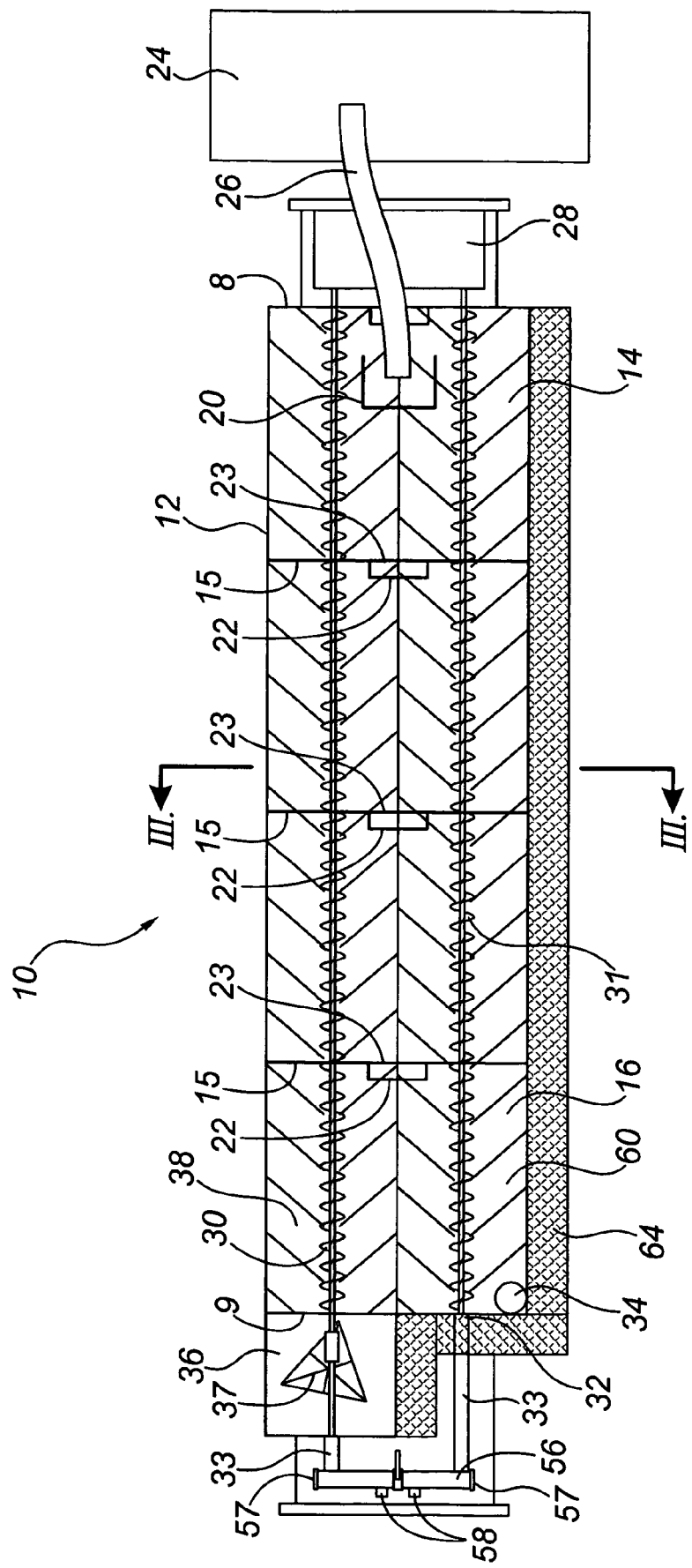
FIG. 2 is a top plan view of the apparatus of the present invention.
Figure 3:
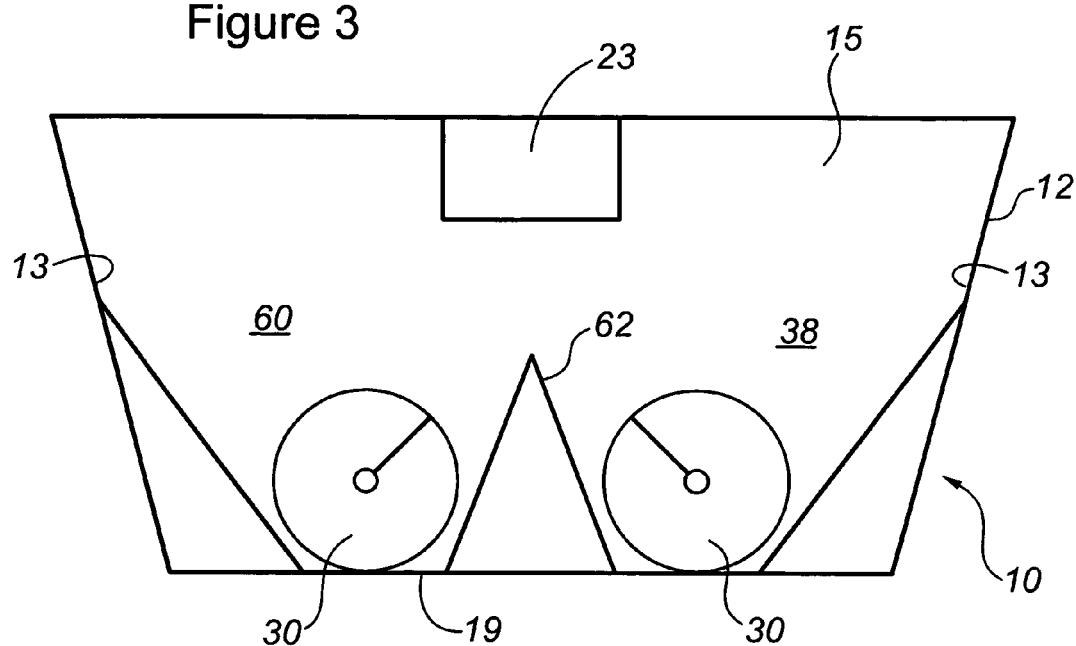
FIG. 3 is a cross-sectional end view of Section III—III.
Figure 4:
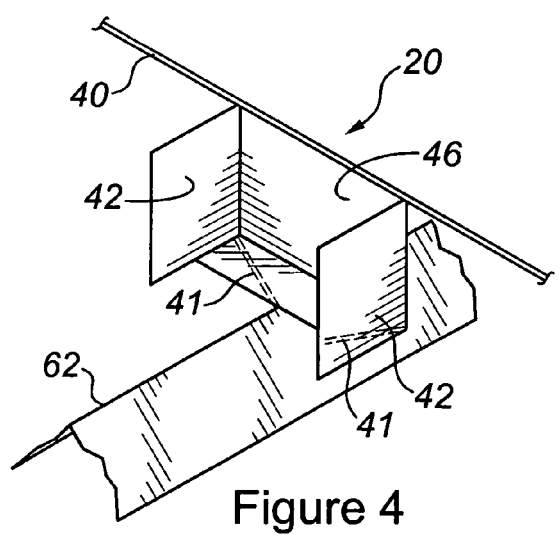
FIG. 4 is a perspective view of the flow-reversing barrier of the apparatus of the present invention.
Figure 5:
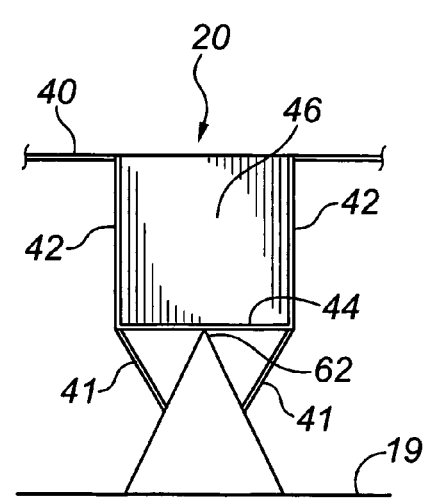
FIG. 5 is a front elevational view of the flow-reversing barrier of the apparatus of the present invention.
Figure 6:
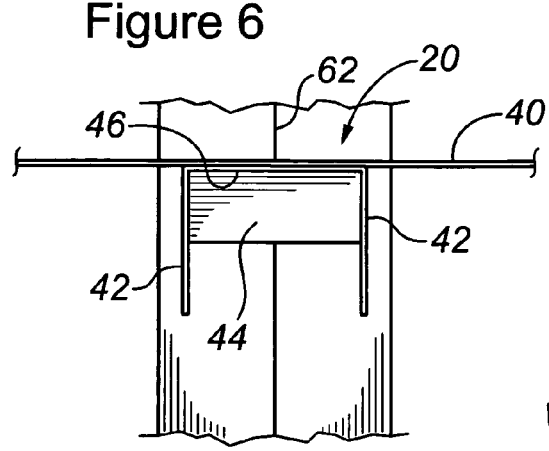
FIG. 6 is a top plan view of the flow-reversing barrier of the apparatus of the present invention.
Figure 7:
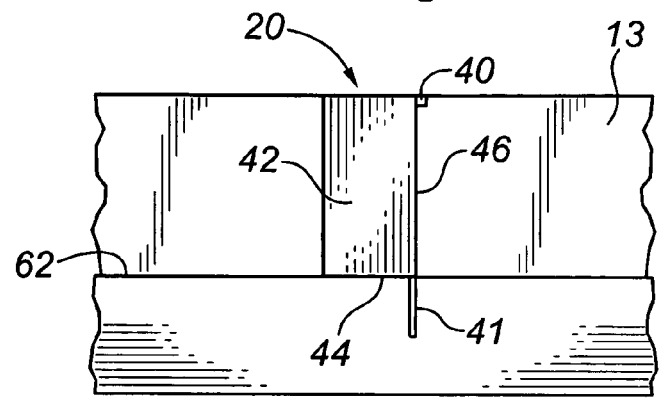
FIG. 7 is a side elevational view of the flow-restricting baffle of the apparatus of the present invention.
Figure 8:
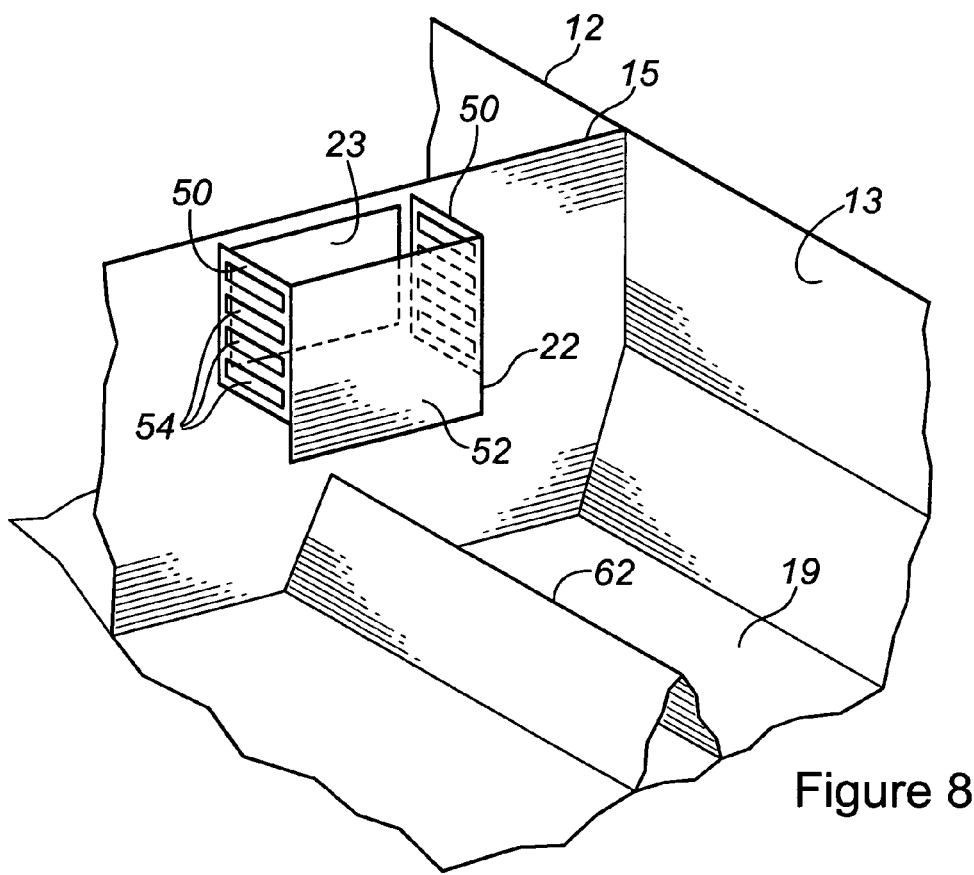
FIG. 8 is a perspective view of the flow-restricting baffle of the apparatus of the present invention.
Figure 9:
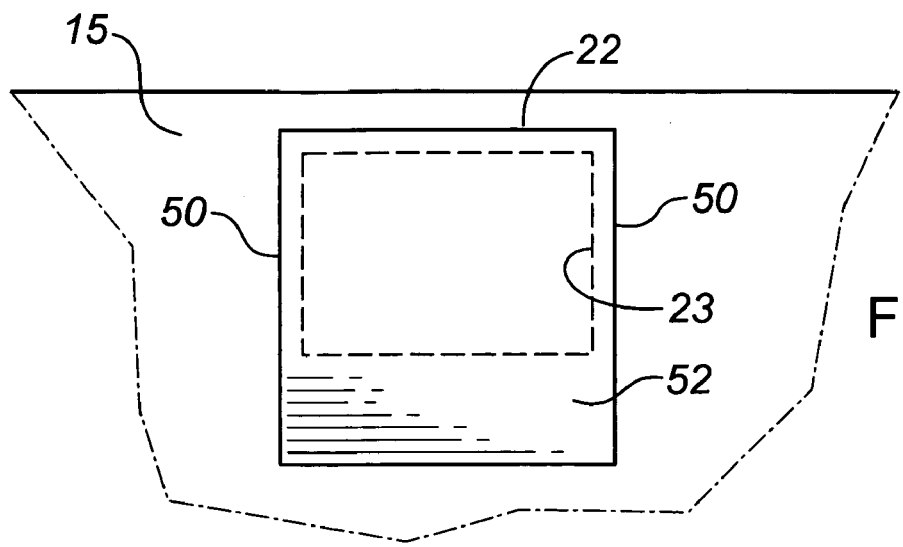
FIG. 9 is a front elevational view of the flow-restricting baffle of the apparatus of the present invention.
Figure 10:
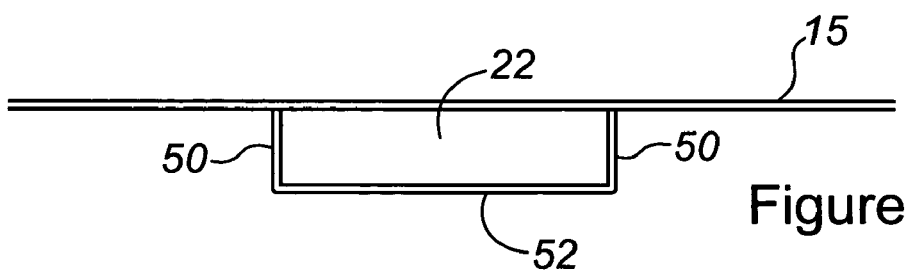
FIG. 10 is a top plan view of the flow-restricting baffle of the apparatus of the present invention.
Figure 11:
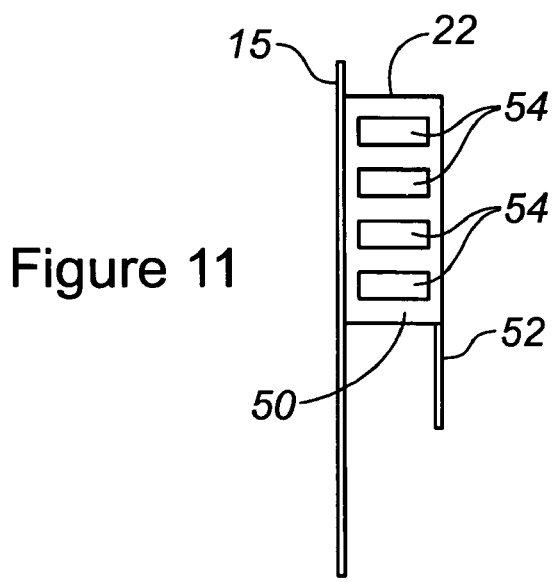
FIG. 11 is a side elevational view of the flow-restricting baffle of the apparatus of the present invention.

The present invention is concerned with a method and apparatus for recycling drilling fluids used in the drilling of wells. Illustrated in FIGS. 1 and 2 is the preferred embodiment of the apparatus of the present invention. The apparatus 10 includes settling tank 12 which comprises of end walls 8 and 9, side walls 13 and bottom 19. Preferably, the dimensions of tank 12 are 50 feet long by 5 feet high by 10 feet wide. The preferred embodiment has three transverse walls 15 within tank 12 to form four compartments that are approximately 3,172 gallons in volume each for a total capacity of 12,688 gallons in tank 12. One compartment defined by a transverse wall 15 is receiving compartment 14 located adjacent to end wall 8 of tank 12. Another compartment defined by a transverse wall 15 is collecting compartment 14 located adjacent to end wall 9 of tank 12. The third transverse wall 15 defines the two intermediate compartments 18 between receiving compartment 14 and collecting compartment 16. Pump 34 is located in collecting compartment 16 to withdraw fluid that has passed through tank 12 for re-use in drilling operations.

Bottom wall 19 of tank 12 in combination with inverted V-shaped rib 62 form troughs 38 and 60 that run lengthwise along tank 12 from end wall 8 to end wall 9. In troughs 38 and 60, respectively, augers 30 and 31 are used as material conveyors to move settled solids towards outlets 32 located on end wall 9. In the preferred embodiment, augers 30 and 31 are 10 inches in diameter and have a pitch of 10 inches. Augers 30 and 31 turn at approximately 9 revolutions per minute and are driven by drive mechanism 28. In the preferred embodiment, drive mechanism 28 comprises of an electric motor in the 2 to 3 horsepower range coupled to a gearbox (not shown). The output of the gearbox is coupled to one auger via a belt and pulley system (not shown). To synchronize the two augers to turn at the same rate, each auger has a chain sprocket and are coupled to one another via a drive chain (not shown). It should be obvious to one skilled in the art that drive mechanism 28 may also use an internal combustion engine or a hydraulic drive system as the motive power to turn the augers. It should also be obvious that the gear ratio of the gearbox and the pulley sizes are dependent on the type of motive power used in order to obtain the desired turning rate of the augers.

A flow-reversing barrier 20 constructed from sheet steel is mounted substantially in the centre of receiving compartment 14 as shown in FIGS. 1 and 2. Referring to FIGS. 4, 5, 6 and 7, barrier 20 has a vertical main back panel 46 of approximately 34 inches high by 36 inches wide and two vertical side panels 42 perpendicular to back panel 46, each side panel 42 being approximately 34 inches high by 24 inches wide thereby forming a U-shaped structure. Barrier 20 also has a bottom plate 44 between side panels 42 approximately 36 inches wide extending 12 inches from back panel 46 along the bottom edge of side panels 42. The top of barrier 20 is supported by support bar 40 that runs transverse across the top of tank 12. Bottom plate 44 sits on top of rib 62. Barrier 20 is further supported by struts 41 that extend diagonally upward from rib 62 to the bottom edge of back panel 46. This results in the top of barrier 20 being approximately flush with the top of tank 12.

Within tank 12, transverse walls 15 define and separate receiving compartment 14, intermediate compartments 18 and collecting compartment 16 within tank 12. On each transverse wall 15, there is an opening 23 located near or at the top of transverse wall 15. Preferably, opening 23 is approximately 12 inches high by 18 inches wide. A flow-restricting baffle 22 is mounted on the downstream side of each transverse 15 wall, aligned with opening 23 as shown in FIGS. 1 and 2. Referring to FIGS. 8, 9, 10 and 11, baffle 22 is constructed from sheet steel and has a vertical back plate 52 approximately 28 inches high by 18 inches wide and two vertical side walls 50 perpendicular to back plate 52, each side wall 50 being approximately 24 inches high by 8 inches wide to form a U-shaped structure. Each side wall 50 of baffle 22 has five horizontal openings 54, each approximately 6 inches wide by 2 inches high, stacked vertically on side wall 50.

Referring to FIGS. 1 and 2, the preferred embodiment of the apparatus also includes mixing tank 36 attached to end wall 9 of tank 12. Contained in mixing tank 36 is mixer 37. Mixer 37 is mechanically coupled to auger 30 contained in trough 38 such that mixer 37 operates when auger 30 is driven by drive mechanism 28. Mixer 37 is used to prepare a flocculating chemical agent that assists in settling solids from the drilling fluid. In the apparatus as built, drilling fluid is skimmed from collecting compartment 16 and mixed with the chemical in mixer 37 and is pumped into receiving compartment 14 to mix with the received drilling fluid and assist in the settling of solids contained the drilling fluid. Another feature of the preferred embodiment of the apparatus of the present invention includes a walkway 64 is mounted on a side wall 13 to permit an operator to inspect the fluid as passes through tank 12.

In operation, drilling fluid containing solids is pumped from holding tank 24 into receiving compartment 14 and directed towards flow-reversing barrier 20 via inlet 26. The flow of fluid is stopped by barrier 20 and reverses to flow around side panels 42. This causes heavier solids to settle to troughs 38 and 60 of tank 12. As the fluid level rises in receiving compartment 14, the fluid will overflow into the adjacent downstream intermediate compartment 18 through opening 23 in transverse wall 15 separating the two compartments. Fluid flowing through opening 23 encounters flow-restricting baffle 22 where the fluid will strike back plate 52 and deflect downwards to bottom 19 of tank 12. Fluid also passes through slots 54 in side walls 50 of baffle 22. The flow of fluid through baffle 22 causes further solids in the fluid to settle to the bottom of tank 12. Fluid flows from compartment to compartment by passing through successive baffles 22 in each transverse wall 15 until the fluid reaches collecting compartment 16. Fluid is withdrawn from collecting compartment 16 by pump 34 to be used again in the drilling operations.

The solids that have settled to the bottom 19 of tank 12 are conveyed by augers 30 and 31 along troughs 38 and 60, respectively towards collecting compartment 16. Augers 30 and 31 expel a slurry of solids and fluid through outlets 32 on end wall 9 of tank 12. In the preferred embodiment, outlets 32 are coupled to pipes 33 which are preferably 10 inches in diameter. Pipes 33 extent to intersect with plenum 56, also made of 10 inch diameter pipe. Plenum 56 has end covers 57 that are removable that allow for clean-out of plenum 56. Plenum 56 receives the slurry discharged from outlets 32 and directs the slurry to discharge ports 58. Ports 58 are typically 4 inches in diameter and are connected via tubes, pipes or hoses (not shown) to a pump (not shown) to transfer the slurry to a centrifuge (not shown). The centrifuge is used to separate the residual fluid from the solids in the slurry. Fluid recovered from the centrifuge may be re-introduced into the tank at the receiving compartment to remove further residual solids or it may be re-used directly in the drilling operations.

The apparatus as built can accommodate a flow rate of drilling fluid in the range of 0 to 500 gallons per minute. It should be obvious to those skilled in the art that the size of tank 12 and the volume of each compartment is a function of the volume of drilling fluid to be recycled and the amount of solids that need to be removed from the fluids to facilitate their reuse. The size and dimensions of tank 12 can be scaled larger or smaller, accordingly, to suit the drilling operation the present invention is being used with. While the preferred embodiment of the apparatus of the present invention incorporates three transverse walls to form four compartments, fewer or more transverse walls may be installed in the settling tank to accommodate the volume of drilling fluid required for the drilling operations.

Although a few preferred embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized at the scope of the invention as defined and limited only by the claims that follow.

I claim:

1. A method for recycling drilling fluid containing solids, comprising:
   a) directing a stream of drilling fluid containing solids into a substantially vertical flow-reversing barrier located in a receiving compartment of a settling tank, the settling tank further comprising a collecting compartment, the collecting compartment separated from the receiving compartment by a transverse wall, the wall defining an aperture with a flow-restricting baffle attached thereto and extending perpendicular from the wall into the collecting compartment, the flow-reversing barrier capable of causing the stream to reverse direction and flow around the barrier thereby causing at least some of the solids contained in the fluid to settle to the bottom of the tank;
   b) allowing the stream of fluid to fill the receiving compartment and pass through the aperture and flow-restricting baffle of the transverse wall as the fluid flows in a first direction from the receiving compartment to the collecting compartment, the flow-restricting baffle capable of causing at least some of the remaining solids contained in the fluid to settle to the bottom of the tank as the fluid flows through the aperture and baffle;
   c) allowing the fluid to flow in the first direction and fill the collecting compartment;
   d) extracting fluid from the collecting compartment for re-use in drilling operations;

e) moving the settled solids on the bottom of the tank in the first direction towards an outlet located in the collecting compartment; and f) removing a mixture of fluid and solids from the outlet.

2. The method as set forth in claim 1 further comprising the step of flowing the fluid in the first direction through an aperture with a flow-restricting baffle of at least one additional transverse wall, the at least one additional transverse wall located between the receiving compartment and the collecting compartment in the tank and defining at least one intermediate compartment, the flow-restricting baffle capable of causing at least some of the remaining solids contained in the fluid to settle to the bottom of the tank as the fluid flows through the aperture and baffle.

3. The method as set forth in claim 1 further comprising the step of introducing an effective amount of a flocculating agent into the receiving compartment as the stream of drilling fluid containing solids is directed towards the flow-reversing barrier.

4. The method as set forth in claim 1 further comprising the step of passing the mixture of fluid and solids removed from the outlet through a centrifuge having an overflow and an underflow whereby the overflow produces an additional amount of fluid for re-use in drilling operations.

5. An apparatus for removing solids from drilling fluid, comprising:

a) a settling tank having first and second end walls, two side walls extending between the end walls and a bottom enclosing the area defined by the bottom edges of the end walls and the side walls, the tank forming a receiving compartment adjacent to the first end wall and a collecting compartment adjacent to the second end wall, the second end wall defining an outlet;

b) a substantially vertical flow-reversing barrier mounted in the receiving compartment, the barrier adapted to receive a stream of drilling fluid containing solids, the barrier capable of causing the stream to reverse direction and flow around the barrier thereby causing at least some of the solids contained in the fluid to settle to the bottom of the tank;

c) a wall transversely mounted in the tank between the side walls, the wall separating the receiving and collecting compartments, the wall defining an aperture having a flow-restricting baffle, the baffle extending perpendicular from the wall into the collecting compartment, the baffle capable of causing at least some of the remaining solids contained in the fluid to settle to the bottom of the tank as fluid flows in a first direction from the receiving compartment to the collecting compartment and passes through the aperture and baffle; and d) a material conveyor for moving the settled solids at the bottom of the tank towards the outlet on the second end wall.

6. The apparatus as set forth in claim 5 wherein the barrier is mounted substantially central in the receiving compartment, the barrier comprising:

a) a rectangular back panel, the panel parallel to the first end wall;

b) two rectangular side panels extending perpendicular from the side edges of the back panel towards the first end wall; and c) a rectangular bottom plate extending perpendicular from the bottom edge of the back panel towards the first end wall and extending between the side panels, the bottom plate affixed to the back panel and the side panels.

7. The apparatus as set forth in claim 5 further comprising at least one additional wall transversely mounted between the side walls thereby defining an at least one intermediate compartment between the receiving and collecting compartments, the at least one additional wall defining an aperture having a flow-restricting baffle, the baffle extending from the at least one additional wall towards the collecting compartment, the baffle capable of causing at least some of the remaining solids in the fluid to settle to the bottom of the tank as the fluid flows in the first direction through the aperture and baffle.

8. The apparatus as set forth in claim 7 wherein the baffle comprises a rectangular back plate parallel to the wall, the back plate spaced apart from the wall by two rectangular side walls extending perpendicular from the side edges of the back plate towards the wall and attached thereupon, each side wall defining a plurality of slot-shaped openings.

9. The apparatus as set forth in claim 5 wherein the bottom of the tank comprises a v-shaped trough running lengthwise along the tank from the first end wall to the second end wall, the trough adapted to collect solids settled from the fluid, the trough aligned with the outlet on the second end wall.

10. The apparatus as set forth in claim 9 wherein the material conveyor is an auger running lengthwise along the bottom of the trough, the auger driven by a drive mechanism mounted on the first end wall, the auger capable of moving settled solids towards the second end wall and through the outlet.

11. The apparatus as set forth in claim 10 wherein the bottom of the tank comprises two parallel v-shaped troughs running lengthwise along the tank from the first end wall to the second end wall, the second end wall having two outlets, each outlet aligned with a trough, each trough having an auger driven by the drive mechanism, each auger capable of moving settled solids towards the second end wall and through an outlet.

* * * * *